SHIFT REGISTER EMPLOYING INSULATED GATE FIELD EFFECT TRANSISTORS

Filed July 27, 1964

INVENTOR.
ROBERT H. NORMAN
HOMER E. STEPHENSON
BY Jack M. Wiseman
ATTORNEY

INVENTOR.
ROBERT H. NORMAN
HOMER E. STEPHENSON
BY Jack M. Wiseman
ATTORNEY

United States Patent Office 3,454,785

Patented July 8, 1969

3,454,785
SHIFT REGISTER EMPLOYING INSULATED GATE FIELD EFFECT TRANSISTORS

Robert H. Norman, Los Altos, and Homer E. Stephenson, Sunnyvale, Calif., assignors, by mesne assignments, to Philco-Ford Corporation, a corporation of Delaware Filed July 27, 1964, Ser. No. 385,444
Int. Cl. G11b *9/06*
U.S. Cl. 307—221 8 Claims The present invention relates in general to a shift register or clocked delay line and more particularly to a shift register employing field effect transistors.

Heretofore shift registers employing field effect transistors were complicated in construction and required complex driving signals. For example, one such shift register requires field effect transistors of both conductivity types in each stage and four phase bipolar clock pulse driving sources.

Accordingly several objects of the present invention are: (1) to provide a new and improved shift register using field effect transistors, (2) to provide such a shift register whose construction and operation are relatively simple and therefore more reliable, and (3) to provide such a shift register which requires relatively simple driving signals. Additional obpects of the invention are: (4) to provide a shift register which can easily be constructed in integrated circuit form, (5) to provide a shift register which requires relatively low power, (6) to provide a shift register which has a wider frequency range of operation, and (7) to provide a shift register which can be made to have as many stages as desired.

Other objects and advantages of the present invention will be apparent to one skilled in the art from the following description taken in conjunction with the accompanying drawings, in which.

Figure 1:
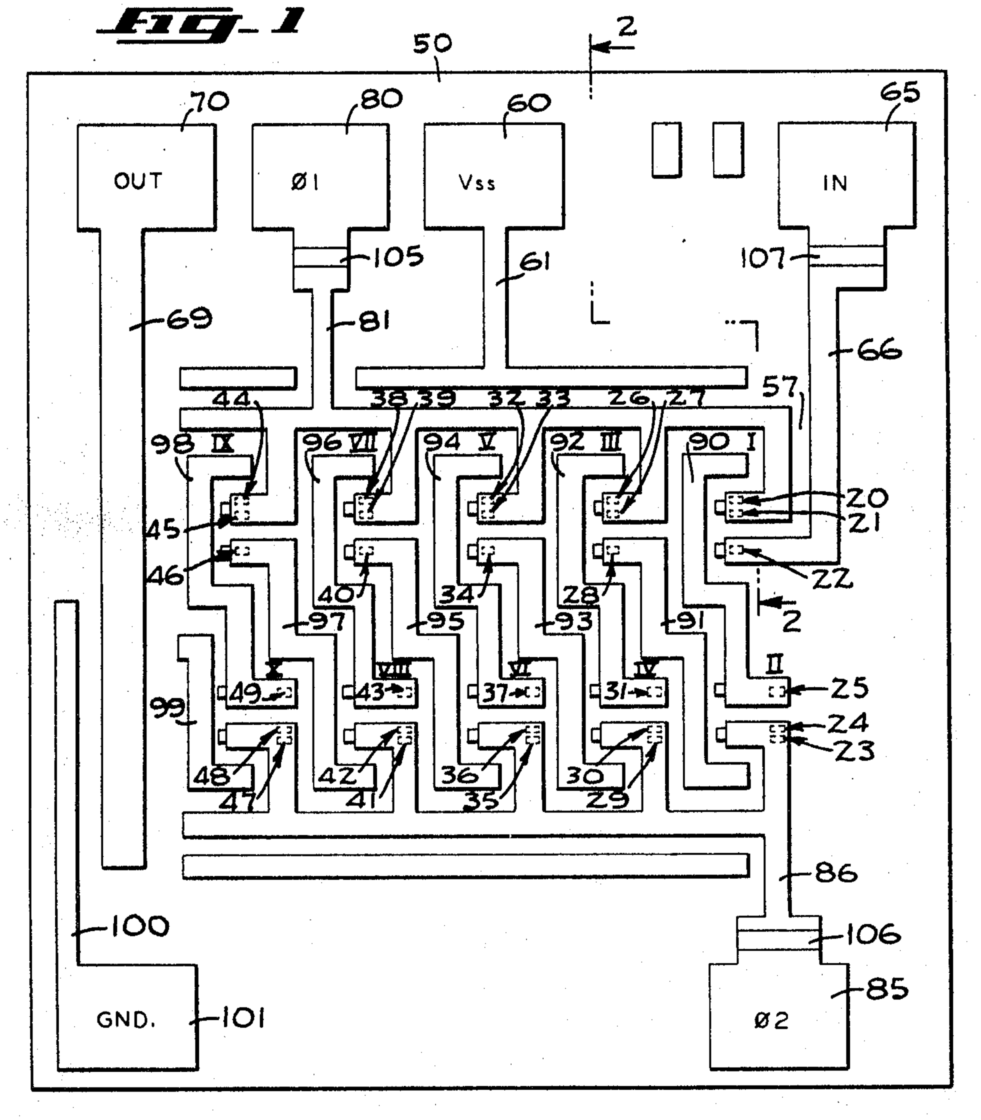
FIG. 1 is a diagrammatic plan view of an integrated circuit embodiment of the shift register of the present invention.
Figure 2:
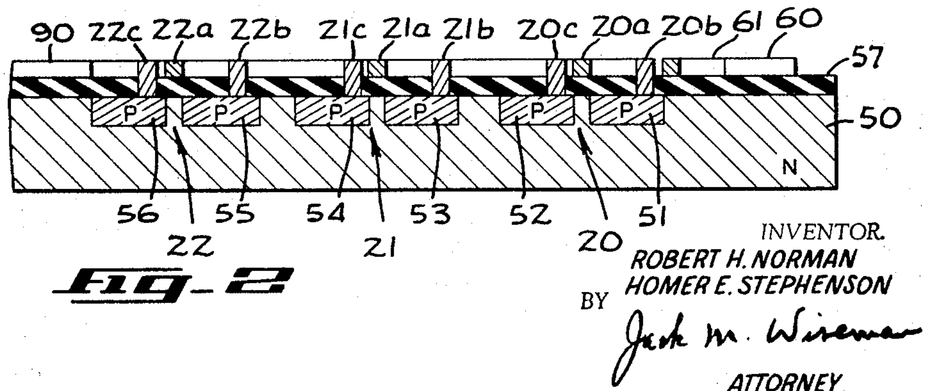
FIG. 2 is an enlarged fragmentary vertical sectional view taken along line 2—2 of FIG. 1.

As shown in FIGS. 1 and 2, the shift register of the invention comprises a plurality of interconnected insulated gate or metal oxide semiconductor field effect transistors 20–49. Although these transistors are shown as embodied in a single semiconductor body 50, which may be of N-type silicon, discrete devices with separate external interconnections may alternatively be utilized.

Figure 3:
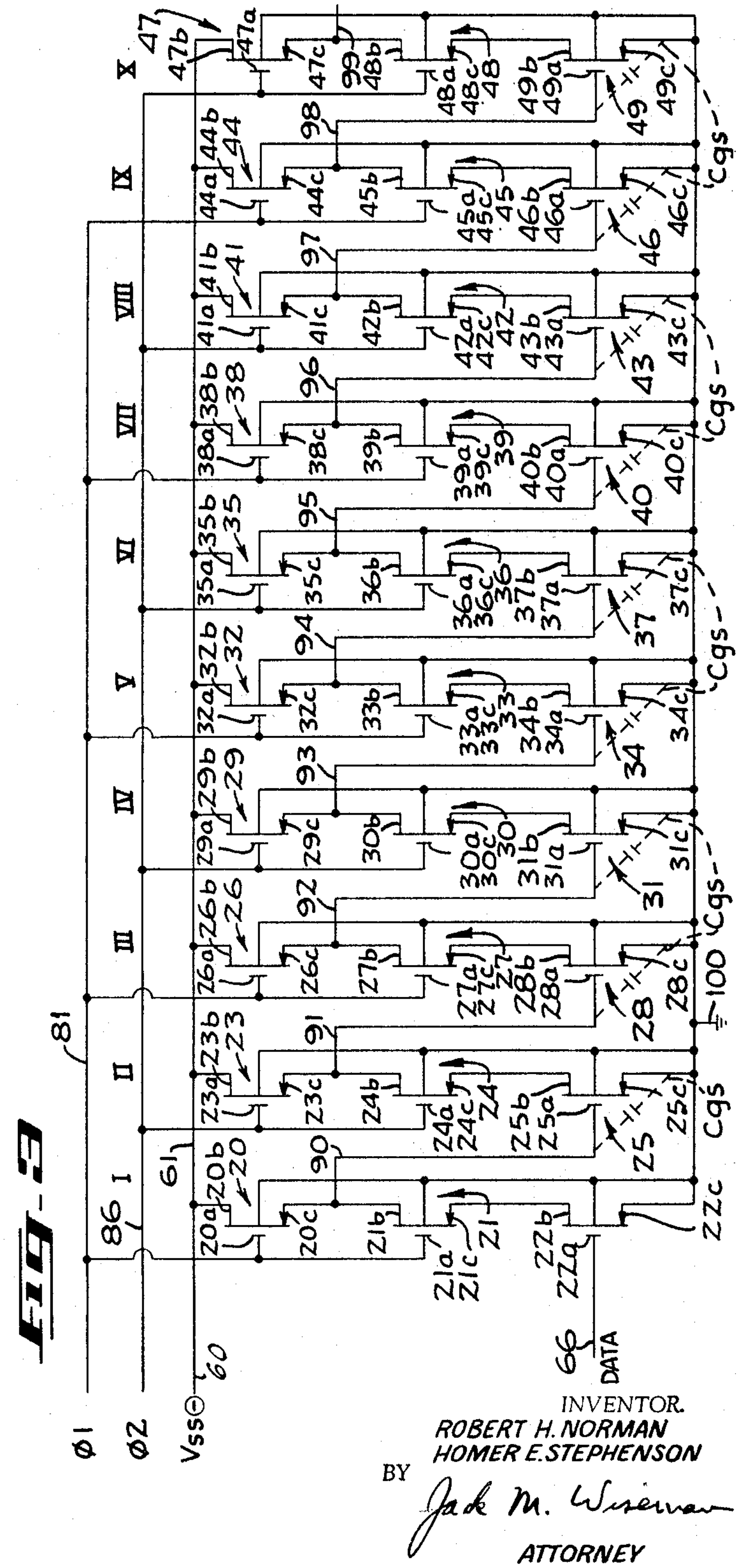
FIG. 3 is a schematic diagram of the shift register of the present invention.

As shown in FIG. 3, transistors 20–49 are arranged in groups of three, with typical groups being 20–22, 23–25, 26–28, 29–31 . . . 47–49. The source-drain circuits of each group of three transistors are connected electrically in series by means of the usual metallic (e.g., aluminum) film surface conductors.

Each transistor has a gate electrode, a soure region, and a drain region. The drain and source regions are formed of P-type regions 51–56, which are diffused in body 50. By means of the aluminum surface conductors, ohmic contacts are formed on the source and drain regions through holes in the silicon dioxide surface layer 57. A disclosure of the foregoing may be found in the patent to Dawon Kahng, No. 3,102,230, issued Aug. 27, 1963, for Electric Field Controlled Semiconductor Device.

In FIGS. 1 and 3, the gate electrodes of transistors 20–49 are designated by the reference numeral of the associated transistor with a suffix *a*, the drain electrodes with a suffix *b*, and the source electrodes with a suffix *c*. By way of example, the source electrode of transistor 22 is designated 22*c*.

As shown in FIG. 3, the shift register includes 10 groups I–X of three transistors each although in practice at least forty groups are generally employed. The odd groups I, III, V, VII and IX are disposed in parallel relation along chip 50 as are the even groups II, IV, VI, VIII and X. In practice, the foregoing ten groups merely occupy one-fourth of the surface of a typical chip and a similar construction and arrangement is provided for the remaining three fourths of the chip.

Connected to terminal 60 (FIG. 3) is a negative supply voltage $V_{ss}$ terminal connected to the drain electrodes of transistors 20, 23, 26, 29, 32, 35, 38, 41, 44, and 47, by way of bus 61.

The input signals for the shift register are supplied to terminal 66 which is connected to gate 22*a* of transistor 22.

The delayed output signals are supplied by the shift register at output terminal 99 which is connected to the source electrode 47*c* of transistor 47.

Figure 4:
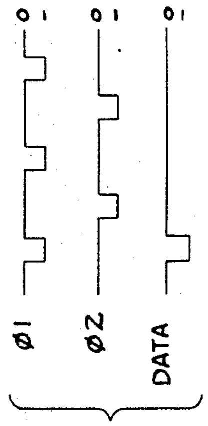
FIG. 4 is a graphic representation of the clock pulse synchronizing signals and the data input signal supplied to the shift register.

Supplied to the gate electrodes of transistors 20, 21, 26, 27, 32, 33, 38, 39, 44, and 45 by way of a bus 81 is a negative clock pulse train shown at $\phi$1 in FIG. 4.

Supplied to the gate electrodes of transistors 23, 24, 29, 30, 35, 36, 41, 42, 47, and 48 by way of a bus 86 is an out-of-phase clock pulse train shown as $\phi$2 in FIG. 4.

From the foregoing, it is to be noted that clock pulses $\phi$1 are impressed on the gates of the top two transistors of each odd group while clock pulses $\phi$2 are impressed on the gates of the top two transistors of the alternate or even groups.

For connecting the groups I–X of transistors in cascade, the source electrode of the top transistor of each group is connected to the gate electrode of the bottom transistor of each succeeding group.

A ground bus 100 and a metal terminal pad 101, which is also made from an aluminum film strip. The aluminum film strip 100 is connected to the source electrode of the bottom transistor of each group.

By employing metal oxide semiconductor field effect transistors, a relatively high resistance-capacitance time constant is attained between successive transistors for interstage storage in excess of the phase time difference of the $\phi$2 and $\phi$1 pulses.

It is to be noted that the top transistor of each group has a higher conducting impedance from source to drain than that of the other two transistors of the same group. As is well known, the conducting impedance of the transistors 20–49 is controlled by the device geometry and dimensions. The top transistor of each group acts as a load device, the middle transistor as an isolation device, and the bottom transistor as a data input and storage device.

The load and isolation transistors of each odd numbered group are rendered conductive or enabled when the synchronizing clock pulse signal $\phi$1 is negative. Likewise, the load and isolation transistors of each even numbered group are rendered conductive or enabled when the synchronizing clock pulse signal $\phi$2 is negative. Transistor 22 of group I is enabled or rendered conductive while the data input signal fed to the gate electrode 22*a* thereof is negative.

During the first cycle of operation, a negative input signal to be delayed is fed to gate 22*a* to enable transistor 22 while the clock pulse $\phi$1 is negative. Since at this time a negative voltage is supplied to the gate electrodes of all three transistors, a current will flow from the $V_{ss}$ source through all these series connected source-drain circuits. Transistors 20–22 will stop conducting current when the clock synchronizing pulse signal $\phi 1$ returns to zero potential.

While transistors 20–22 of group I are conducting, any charge present at the gate electrode 25*a* of transistor 25 of group II will be discharged through the transistors 21 and 22 to ground. Thus, any charge on gate electrode 25*a* of transistor 25 of group II will be reduced to substantially zero when a negative input is supplied to gate electrode 22*a* and a clock pulse signal appears on the $\phi 1$ bus. This is analogous to the customary inverting function provided by most amplifying stages.

When the synchronizing clock pulse signal $\phi 1$ returns to zero, the semiconductor devices 20–21 are turned off, leaving the input capacity discharged and isolated by the high input impedance at the junction of 20*c*, 21*b*, and 25*a*. This discharged condition will be maintained for a period greater than one-half the interval between successive pulses in the clock synchronizing pulse signal $\phi 1$.

When the synchronizing clock pulse signal $\phi 2$ goes negative the near zero potential at the gate electrode 25*a* of transistor 25 of group II will insure that transistor 25 remains nonconductive. Thus when the $\phi 2$ bus goes negative, transistors 23 and 24 but not transistor 25 will conduct. As a consequence thereof, a negative potential representative of the data input signal delayed one cycle is transferred via lead 91 to the gate electrode 28*a*, thereby causing a negative charge to be stored on the gate electrode 28*a*. This potential charge is equal to $V_{ss}$ less the voltage drop across transistor 23.

The negative charge applied to the gate electrode 28*a* is sufficient to render transistor 28 of group III conductive. When the clock pulse signal $\phi 2$ returns to zero, transistors 23–25 will be non-conducting leaving the input capacity to the gate 28*a* charged and isolated by the high input impedance at the junction of 23*c*, 24*b* and 28*a*. This charge will be maintained for a period greater than one-half the interval between successive pulses in the clock synchronizing pulse signal $\phi 2$.

At the time the next pulse of the clock pulse signal $\phi 1$ is supplied the gate electrodes of transistors 26 and 27 of group III will go negative along with gate electrode 28*a*. This will cause any potential on the gate electrode 31*a* to be discharged through transistors 27 and 28 to near ground. The above-described sequence will thereafter be repeated for the succeeding groups of transistors.

It is apparent, therefore, that the signal transferred to the even group II, IV, VI, VIII and X in the shift register will be representative of the input signal with an opposite polarity and delayed one-half bit time from the preceding odd group, and that the signal presented to the odd groups III, V, VII, and IX will be representative of the input signal with the same polarity and delayed one bit time from the preceding odd group. The output of group X will be representative of the input signal at the same polarity with a five bit delay.

Thus, the shift register is capable of performing the function of a synchronized delay line. Any desired delay or register length can be attained by adding in cascade additional groups of transistors.

During a succeeding cycle, another negative input signal can be fed to the gate electrode transistor 22 of group I and will thereupon be propagated in clock synchronism through the shift register until fed to the output terminal. The advancement of the input signals through the shift register is slaved to the timing of clock synchronizing pulses $\phi 1$ and $\phi 2$.

It is to be understood that modifications and variations of the invention disclosed herein may be resorted to without departing from the spirit of the invention and the scope of the appended claims.

We claim:

1. A shift register comprising:
a semiconductor body,
a first group and a second group of field effect transistors formed in said body, each transistor of each group having a gate electrode, a source electrode, and a drain electrode, a first transistor of each group having a higher conducting impedance from source to drain than the other transistors of each group,
means for supplying an input signal to the gate electrode of a second of said transistors of said first group,
means on said body for connecting the source electrode of said first transistor of said first group to the gate electrode of a second of said transistors of said second group so as to connect said second group of transistors in cascade with said first group,
means for supplying a first train of synchronizing pulses to the gate electrodes of the transistors of said first group other than said second transistor thereof,
means for supplying a second train of synchronizing pulses signal to the gate electrodes of the transistors of said second group other than said second transistor thereof,
said second train of synchronizing pulses being out of time phase with said first train of synchronizing pulses, and
means connected to said second group of transistors for supplying an output signal representative of a delayed version of said input signal.

2. A shift register comprising a plurality of groups of transistors, each group comprising a plurality of field effect transistors which are connected in series from sources to drain,
means for connecting said groups of transistors in cascade,
means for supplying a first train of synchronizing pulses to alternate groups of said transistors, said pulses being supplied to the gate electrodes of plurality of transistors of each group,
means for simultaneously supplying a second train of synchronizing pulses to the gate electrodes of a plurality of transistors of a group of transistors interposed between said alternate groups,
said second train of synchronizing pulses being out of time phase with said first train of synchronizing pulses,
means for supplying an input signal to the gate electrode of one transistor in a first group of said transistors, and
means connected to a last group of said transistors for supplying an output signal.

3. A shift register comprising:
a first and a second group of field effect transistors, each group including first, second, and third transistors,
each of said transistors having a gate electrode, a source electrode, and a drain electrode,
supply voltage means for supplying a bias potential to the drain electrodes of said first transistor of each of said groups,
means for supplying a first train of synchronizing pulses to the gate electrodes of said first and second transistors in said first group,
means for supplying a second train of synchronizing pulses to the gate electrodes of said first and second transistors in said second group,
said second train of synchronizing pulses being out of time phase with said first train of synchronizing pulses,
means connecting the source electrode of the first transistor in said first group to the gate electrode of the third transistor in said second group for connecting said two groups in cascade,
means for supplying an input signal to the gate electrode of the third transistor in said first group,
whereby the simultaneous application of said input signal to said third transistor of said first group and said first synchronizing pulse signal to said gate electrodes of said first and second transistors of said first group will render the transistors of said first group conductive so as to discharge any potential charge stored on the gate electrode of said third transistor of said second group, and means connected to the source electrode of said first transistor in said second group for supplying an output signal representative of a delayed version of said input signal.

4. A shift register comprising:

a first and a second group field effect transistors, each group having first, second, and third transistors, each of said transistors having a gate electrode, a source electrode, and a drain electrode, said first transistor of each group having a higher conducting impedance between its source and drain electrodes than said second and third transistors of each group, supply voltage means for supplying a bias potential to the drain electrodes of the first transistor in each of said groups, means for supplying a first train of synchronizing pulses to the gate electrodes of said first and second transistors in said first group, means for supplying a second train of synchronizing pulses to the gate electrodes of said first and second transistors in said second group, said second train of synchronizing pulses being out of time phase with said first train of synchronizing pulses, means connecting the source electrode of the first transistor in said first group to the gate electrode of the third transistor in said second group for connecting said second group in cascade with said first group, means for supplying an input signal to the gate electrode of the third transistor in said first group, whereby the simultaneous application of said input signal to said third transistor in said first group and said first synchronizing pulse signal to said gate electrodes of said first and second transistors of said first group will render the transistors in said first group conductive so as to discharge through said first and second transistors in said first group any charge stored on the gate electrode of said third transistor in said second group, and means connected to the source electrode of said first transistor in said second group for supplying an output signal representative of a delayed version of said input signal.

5. A shift register comprising:

a first data input field effect transistor having gate, source, and drain electrodes, means for supplying an input signal to the gate electrode of said first transistor for controlling the conduction thereof, a second data input field effect transistor having gate, source, and drain electrodes, an isolation field effect transistor having gate, source, and drain electrodes, the source-drain circuit of said isolation transistor being connected between the drain electrode of said first data input transistor and the gate electrode of said second data input transistor, means for supplying a first train of synchronizing pulses to the gate electrode of said isolation transistor for controlling the conduction thereof between on state and an off state, whereby said off state of said isolation transistor isolates said second transistor from said first transistor and said on state of said isolation transistor forms a path for discharging any charge on the gate electrode of said second transistor, when said first transistor is conducting, and a load field effect transistor having gate, source, and drain electrodes, the source-drain circuit of said load transistor being connected in series with the source-drain circuit of said first transistor, the gate electrode of said load transistor being connected to the gate electrode of said isolation transistor.

6. The shift register of claim 5 further including:

a second load transistor having gate, source, and drain electrodes, the source-drain circuit of said second load transistor being connected in series with the source-drain circuit of said second transistor, and means for supplying a second train of synchronizing pulses to the gate electrode of said second load transistor for controlling the conduction thereof, said second train of synchronizing pulses being out of time phase with said first train of synchronizing pulses.

7. A transistor circuit comprising:

a first data input field effect transistor of one conductivity type having a source, gate, and drain electrodes, means for supplying an input signal to the gate electrode of said data input transistor, a first isolation transistor and a first load transistor, each being of said one conductivity type and having gate, source, and drain electrodes, the source-drain circuit of said load and isolation transistor being connected in series with the source-drain circuit of data input transistor, means for supplying a direct current bias potential between the source electrode of said load transistor and the drain electrode of said data input transistor, means for supplying a first train of clock pulses to the gate electrodes of said isolation and load transistors to control the conduction thereof, and means connected to the junction of said load and isolation transistors for supplying an output signal.

8. The circuit of claim 7 further including a second data input transistor, a second isolation transistor, and a second load transistor, each being similar to said first data input, isolation, and load transistors, the source-drain circuits of said second transistors being connected in series across said means for supplying a direct current bias potential, means for connecting the source electrode of said first load transistor to the gate electrode of said second data input transistor, and means for supplying a second train of clock pulses to the gate electrodes of said second isolation and load transistors to control the conduction thereof, said second train of clock pulses being out of time phase with said first train of clock pulses.

References Cited

UNITED STATES PATENTS

| | | | |
|---|---|---|---|
| 2,971,101 | 2/1961 | Hurst et al. | 328—42 |
| 3,215,859 | 11/1965 | Sorchych | 307—88.5 |
| 3,233,123 | 2/1966 | Heiman | 307—88.5 |
| 3,252,009 | 5/1966 | Weimer | 307—88.5 |

ARTHUR GAUSS, *Primary Examiner.*

JOHN ZAZWORSKY, *Assistant Examiner.*

U.S. Cl. X.R.

307—238, 251, 303, 304

PO-1050
(5/69)

UNITED STATES PATENT OFFICE
CERTIFICATE OF CORRECTION

Patent No. 3,454,785 Dated July 8, 1969

Inventor(s) Robert H. Norman and Homer E. Stephenson

It is certified that error appears in the above-identified patent and that said Letters Patent are hereby corrected as shown below:

Column 5, line 10, after "group" insert -- of --.
Column 6, line 24, after "having" delete "a".
Column 6, line 31, change "sistor" to -- sistors --.

SIGNED AND SEALED
APR 14 1970

(SEAL)
Attest:

Edward M. Fletcher, Jr.
Attesting Officer

WILLIAM E. SCHUYLER, JR.
Commissioner of Patents